(12) United States Patent
Barkan

(10) Patent No.: US 8,028,920 B2
(45) Date of Patent: Oct. 4, 2011

(54) DATA CAPTURE TERMINAL WITH MULTIPLE READERS OPERABLE IN HANDHELD AND HANDS-FREE MODES OF OPERATION

(75) Inventor: Edward Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 552 days.

(21) Appl. No.: 12/215,792

(22) Filed: Jun. 30, 2008

(65) Prior Publication Data

US 2009/0321525 A1   Dec. 31, 2009

(51) Int. Cl.
*G06K 7/10* (2006.01)
(52) U.S. Cl. .............. 235/462.48; 235/472.01; 235/454; 235/451; 235/462.45
(58) Field of Classification Search . 235/462.01–472.03
See application file for complete search history.

(56) References Cited

U.S. PATENT DOCUMENTS

| | | | |
|---|---|---|---|
| 4,613,895 A | 9/1986 | Burkey | |
| 5,703,349 A | 12/1997 | Meyerson et al. | |
| 6,223,988 B1 * | 5/2001 | Batterman et al. | 235/472.01 |
| 6,234,394 B1 * | 5/2001 | Kahn et al. | 235/462.46 |
| 7,207,488 B2 * | 4/2007 | Hammerslag et al. | 235/440 |

* cited by examiner

*Primary Examiner* — Steven S Paik
*Assistant Examiner* — Christle Marshall
(74) *Attorney, Agent, or Firm* — Nongqiang Fan

(57) ABSTRACT

A data capture terminal for, and method of, automatically capturing data in a handheld mode, and in a hands-free mode, of operation, include an actuatable laser scanning reader supported by the terminal for electro-optically reading indicia to obtain data by scanning the indicia, an actuatable imaging reader supported by the terminal for electro-optically reading indicia to obtain data by capturing an image of the indicia, and an actuatable radio frequency identification (RFID) reader supported by the terminal for reading an RFID tag to obtain data. A trigger mechanism is manually actuatable by an operator to initiate actuation of the readers in the handheld mode with different triggering actions unique to the respective readers.

17 Claims, 2 Drawing Sheets

DATA CAPTURE TERMINAL WITH MULTIPLE READERS OPERABLE IN HANDHELD AND HANDS-FREE MODES OF OPERATION

DESCRIPTION OF THE RELATED ART

Moving laser beam-based readers, in both handheld and hands-free modes of operation, have been used to automatically capture data by electro-optically reading coded symbols, particularly one-dimensional Universal Product Code (UPC) type symbols, in supermarkets, warehouse clubs, department stores, and other kinds of retailers for many years. A laser generates a laser beam directed to a symbol, that is located in a range of working distances from the reader and that is associated with a product, for reflection and scattering from the symbol. A detector having a field of view detects light of variable intensity returning from the symbol. A scanner scans at least one of the laser beam and the field of view in a scan pattern comprised of one or more scan lines. When at least one of the scan lines sweeps over the symbol, an electrical signal indicative of the intensity of the detected return light is processed by signal processing circuitry including a microprocessor; the symbol is read; and the product is automatically identified.

Imager-based readers, in both handheld and hands-free modes of operation, have also been used to automatically capture data by electro-optically reading targets such as coded symbols, particularly two-dimensional symbols, in a range of working distances from the reader by employing a solid-state imager to capture an image of each symbol. The imager comprises an array of cells or photosensors, which correspond to image elements or pixels in a field of view of the imager. Such an array may be comprised of a one- or two-dimensional charge coupled device (CCD) or a complementary metal oxide semiconductor (CMOS) device, analogous to those devices used in a digital camera to capture images.

The imager-based reader further typically includes an illuminator to illuminate the symbol during its reading with illumination light emitted from an illumination light source and directed to the symbol for reflection and/or scattering therefrom. The illumination light source may be located within and/or externally of the reader, and comprises one or more light emitting diodes (LEDs). The imager-based reader yet further typically includes an aiming light source for projecting an aiming light pattern on the symbol to facilitate aiming prior to reading, as well as electronic circuitry for producing electrical signals indicative of the light captured by the array, and a microprocessor for processing the electrical signals to produce each captured image.

It is therefore known to use a solid-state imager for capturing a monochrome image of a symbol as, for example, disclosed in U.S. Pat. No. 5,703,349. It is also known to use a solid-state imager with multiple buried channels for capturing a full color image of a target as, for example, disclosed in U.S. Pat. No. 4,613,895. It is common to provide a two-dimensional CCD with a 640×480 resolution commonly found in VGA monitors, although other resolution sizes are possible.

Radio frequency identification (RFID) is also known in the field of automatic data capture. A transponder, known generally as a tag, is attached to an object and communicates wirelessly with an RFID reader. RFID technology is used in a variety of applications including retail, industrial, transportation, tracking, security, animal identification and individual identification. Transfer of data via RFID technology may be used, for example, for indicating the presence of the object, such as in electronic article surveillance (EAS), for obtaining data associated with the object or for identifying the object. In an automatic identification system, the tag is typically programmed with unique information, such as encoded data including an identifying code. The RFID reader includes an antenna which emits radio carrier signals to activate the tag and read data from it, and a decoder for decoding the data read. The tag responds to the signal by modulating the carrier signal in accordance with the encoded data.

RFID technology allows for non-contact reading. The RFID reader may be a mobile reader, such as a handheld reader, or a stationary hands-free reader such as a reader located in a tunnel, a door portal or a toll booth. The electromagnetic field generated by the antenna may be constant or activated by an actuator such as a sensor or a trigger. Advantages to RFID technology include non-contact reading without the need for line-of-sight interrogation.

In the hands-free mode of either the moving laser beam-based reader or the imager-based reader, an operator may slide or swipe the product bearing the symbol past a window/presentation area of either reader in a stroke, either from right to left, or from left to right, or at any angle of inclination, in a "swipe" mode. Alternatively, the operator may present the symbol on the product, preferably to an approximate central region of the respective window/presentation area, and hold the product at least momentarily steady in a "presentation" mode. The operator may present the symbol anywhere within the field of view, including at the edges of the window/presentation area. The choice depends on operator preference or on the layout of a workstation in which the reader is used. The operator does not touch, grasp or hold the respective reader in the hands-free mode. As for the RFID reader, the operator may either present the tag on the product to a stationary RFID reader, and hold the product at least momentarily steady in a "presentation" mode, or may bring a handheld RFID reader to the tag on the product.

In the handheld mode of either the moving laser beam-based reader, the imager-based reader, or the RFID reader, the operator grasps and holds the respective reader in his or her hand during reading and aims/presents the respective reader at the symbol/tag to be read. The operator may first lift the respective reader from a countertop or a support cradle. Reading is initiated typically by having the operator manually actuate a trigger with his or her index finger. Trigger actuation helps to avoid accidentally reading the wrong symbol/tag. Once reading is completed, the operator may return the respective reader to the countertop or to the support cradle.

Each of the known moving laser beam-based reader and the known imager-based reader often needs to change its reading functionality when it is in the handheld mode, as opposed to when it is in the hands-free mode. For example, a reader may only require a short working distance in the hands-free mode, and a long working distance in the handheld mode. Hybrid data capture terminals have been described as containing both a moving laser beam-based reader and an imager-based reader. One of the readers may be better for reading certain symbols in a particular mode, as opposed to the other reader in the other mode.

These differences in operational behavior between the hands-free and handheld modes require the reader to sense when it is in at least one of the modes, and to automatically change to the other of the modes when the reader senses that the reader is in the other mode. For example, the reader needs to be capable of switching from the hands-free mode to the handheld mode when the reader is picked up by the operator from a countertop, or like support surface.

To accomplish such switching, it is known, for example, to use a mechanical plunger on a base of the reader. The plunger is physically pushed inwardly into the base when the reader is resting on the support surface in the hands-free mode. The plunger is spring-loaded, and automatically moves outwardly of the base when the terminal is lifted from the support surface. The plunger physically moves an opaque component into or out of a path of a light beam emitted by a light source to a light detector. This movement interrupts the light beam and enables the reader to determine when it has been lifted off the support surface, thereby signaling the reader to change operating modes. A mechanical switch having a movable armature could serve the same function.

Another way that known readers have detected when they are picked up is by installing a magnet in the stand or support cradle that is provided to support the reader in the hands-free mode. A magnetic sensor, such as a reed switch or a Hall effect sensor, is mounted in the reader in close proximity to the cradle magnet when the housing is placed in the stand or cradle, thereby allowing the reader to sense when it is placed in, or removed from the stand or cradle by magnetic field interaction and interruption.

As advantageous as the known readers have been in reading symbols, they have not proven to be altogether satisfactory in use. An imaging reader is typically better suited for reading one- and especially two-dimensional symbols at close range, whereas a moving laser beam-based reader is typically better suited for reading one-dimensional symbols at far range. Providing separate readers for the operator to handle is undesirable. When different readers are combined into a single hybrid terminal as described above, accidental reads can occur, especially in the hands-free mode, and the operator typically does not know which reader performed the reading.

SUMMARY OF THE INVENTION

One feature of the present invention resides, briefly stated, in a data capture terminal for, and a method of, automatically capturing data. The terminal could be configured, in one embodiment, as a hands-free and/or a handheld support having a housing with a window. In some applications, the window could be omitted, in which event, the terminal has a windowless opening at which the data is captured. As used herein, the term "presentation area" is intended to cover both a window and a windowless opening. The housing may have a handle for handheld mode operation. The support may have a base for supporting the housing on a support surface for hands-free mode operation. Preferably, the base is connected to the housing in both the handheld and hands-free modes by being pivotably connected to the handle. Also, the housing is preferably configured with a gun-shaped configuration, and a manually actuatable trigger mechanism, as described below, is provided on the housing at a location underlying an operator's fingers when the operator holds the handle in the operator's hand.

In accordance with a preferred embodiment, the terminal has a plurality of readers. One of the readers preferably includes a laser scanning module for electro-optically reading indicia, especially one- and/or two-dimensional symbols. Each symbol includes elements of different light reflectivity, e.g., bars and spaces. The laser scanning module includes electro-optical components supported by the housing and includes a scanner for scanning, in either the handheld mode or the hands-free mode, at least one of a laser beam from a laser and a field of view of a light detector in a scan pattern, typically comprised of one or more scan lines, across the indicia during reading. The laser scanning module may also include signal processing circuitry for processing an electrical analog signal generated by the light detector, and a digitizer for converting the analog signal to a digital signal for subsequent decoding by a controller or programmed microprocessor.

Another of the readers preferably includes an imaging module, also for electro-optically reading indicia, especially one- and/or two-dimensional symbols. The imaging module includes electro-optical components supported by the housing, and includes a one- or two-dimensional, solid-state imager. The imager has an array of image sensors operative, together with an imaging lens assembly, for capturing light, in either the handheld mode or the hands-free mode, from a one- or two-dimensional symbol or target through the presentation area during the reading to produce a captured image with the aid of a controller or programmed microprocessor. Preferably, the array is a CCD or a CMOS array. The imaging module includes an illuminator for illuminating the symbol during the reading with illumination light directed from an illumination light source through the presentation area. The illumination light source comprises one or more light emitting diodes (LEDs). The illuminator is especially useful when the reader is operated in low light or dark ambient environments, but could equally well be used at normal indoor lighting levels. An aiming light assembly can be used to generate an aiming light pattern useful to locate the symbol prior to reading.

Still another of the readers preferably includes a radio frequency identification (RFID) module supported by the terminal for reading an RFID tag or transponder to obtain data. The RFID module includes an antenna which emits radio carrier signals to activate the tag and read the data from it, and a decoder for decoding the data read. The tag responds to the signal by modulating the carrier signal in accordance with the encoded data.

In the case of the hands-free terminal, the symbol/tag is swiped past, or presented to, the presentation area and, in the case of the handheld terminal, the terminal itself is moved and the presentation area is aimed at, or presented to, the symbol/tag. In the preferred embodiment, the terminal is installed in a retail establishment, such as a drug store, a book store, an office supply store, and a liquor store, especially in a cramped environment where space is not readily available for individual readers.

In accordance with an aspect of this invention, the aforementioned trigger mechanism is manually actuatable by an operator to initiate actuation of the readers in the handheld mode with different triggering actions unique to the respective readers. The trigger mechanism includes a trigger depressable by one finger, e.g., the index finger, to initiate actuation of one of the readers, by another finger, e.g., the middle finger, to initiate actuation of another of the readers, and by both fingers, e.g., the index and middle fingers, to initiate actuation of still another of the readers. Preferably, the trigger includes one notch to receive the one finger, and another notch to receive the other finger.

The trigger mechanism also includes one switch that is switched when the trigger is depressed by the one finger, and another switch that is switched when the trigger is depressed by the other finger. Both switches are preferably simultaneously switched when the trigger is depressed by the both fingers. The trigger mechanism generates different control signals in response to the different triggering actions. The controller for the readers is operatively connected to the trigger mechanism, for controlling the readers in response to receiving the control signals.

In the hands-free mode, the controller is operative for automatically actuating at least one of the readers by default. Advantageously, the controller is operative for automatically periodically actuating one of the readers during first time periods, and for automatically periodically actuating another of the readers during second time periods that occur between the first time periods.

Another aspect of this invention, especially useful in the hands-free mode, resides in a plurality of different indicators, each dedicated to a respective reader for indicating a successful reading of the respective reader. For example, an auditory beeper that generates different sounds, or visible lights that generate different colors, can be used to advise the operator which reader successfully decoded a symbol/tag.

In a multi-reader terminal as described herein, the laser scanning module, the imaging module, and the RFID module are in the same support and preferably share the same controller and the same presentation area. Preferably, the laser scanning module and the imaging module are in the same housing, while the RFID module is in the base. In some applications, one of the laser scanning module and the imaging module may be better suited to read a particular symbol than the other of the modules.

Another aspect of the invention still further resides in a method of automatically capturing data in a handheld mode, and in a hands-free mode, of operation, performed by electro-optically reading indicia to obtain data by scanning the indicia upon actuation of a laser scanning reader, by electro-optically reading indicia to obtain data by capturing an image of the indicia upon actuation of an imaging reader, by reading an RFID tag to obtain data upon actuation of a radio frequency identification (RFID) reader, and by initiating actuation of the readers in the handheld mode by having an operator manually actuate a trigger mechanism with different triggering actions unique to the respective readers.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
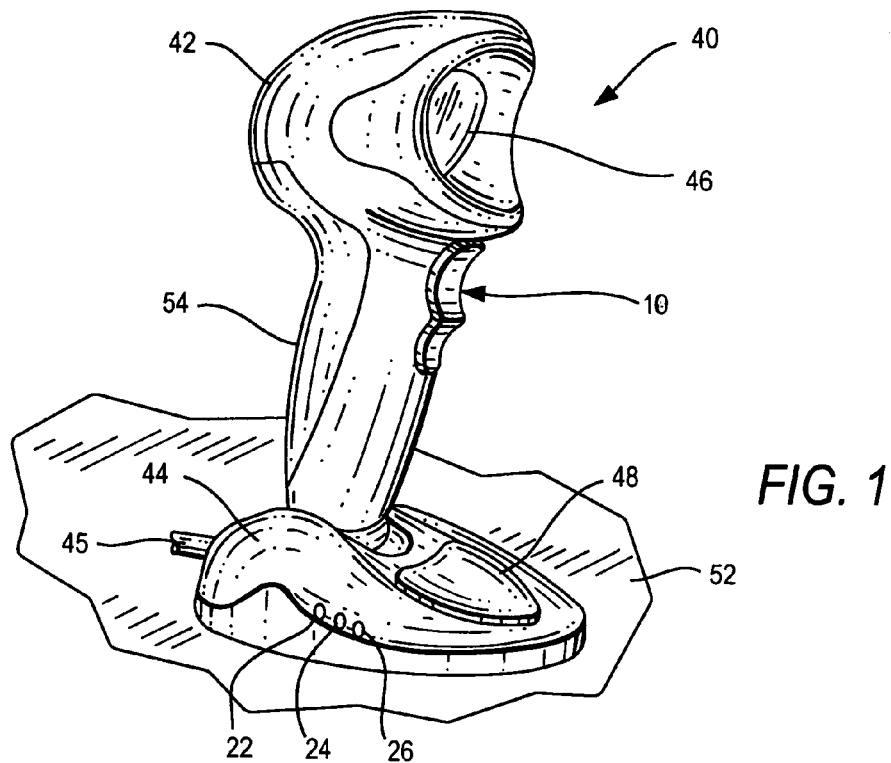
FIG. 1 is a perspective view of a data capture terminal operative in either a handheld mode, or a hands-free mode, for capturing data in accordance with this invention.

Reference numeral 40 in FIG. 1 generally identifies a data capture terminal having a support configured as a gun-shaped housing 42 connected to a base 44. The base 44 rests on a countertop or analogous support surface 52 and serves for supporting the terminal 40. The terminal 40 can thus be used in a hands-free mode as a stationary workstation in which products bearing indicia, such as one- or two-dimensional symbols, to be electro-optically read are presented to, or slid or swiped past, a presentation area or window 46. The gun-shaped housing 42 also has a handle 54 that can be picked up by an operator off the countertop 52 and held in the operator's hand in a handheld mode.

A trigger mechanism 10 is located on the gun-shaped housing 42 at a location underlying an operator's fingers when the operator holds the handle 54 in the operator's hand in the handheld mode. As described in detail below, the trigger mechanism 10 is manually depressed to initiate data capture, e.g., reading of the symbol. The handle 54 is permanently and pivotably connected to the base 44 in both the handheld and hands-free modes for pivoting movement about a generally horizontal pivot axis, that is generally parallel to, and elevated above, the countertop 52. The housing 42 is adjustably tiltable forward and back about the pivot axis in the hands-free mode to aim the window 46 at the symbol to be read.

The terminal 40 may have an imaging module 50 supported by the housing 42, in which event the imaging module 50 includes a one- or two-dimensional, solid-state imager 30 mounted in the housing 42. The imager 30 has an array of image sensors operative, together with an imaging lens assembly 31, for capturing light from a one- or two-dimensional symbol or target through the presentation area 46 during the reading to produce an electrical signal indicative of a captured image for subsequent decoding. Preferably, the array is a CCD or a CMOS array having a 752×480 resolution (wide VGA), although other resolution sizes are possible.

The imaging module 50 includes an illuminator 32 for illuminating the symbol during the reading with illumination light directed from an illumination light source through the presentation area 46. The illumination light source comprises one or more light emitting diodes (LEDs). The illuminator 32 is especially useful when the terminal 40 is operated in low light or dark ambient environments, but could equally well be used at normal indoor lighting levels. An aiming light generator 34 may also be provided for projecting an aiming light pattern or mark on the symbol prior to reading.

In operation of the imaging module 50, a microprocessor or controller 70 sends a command signal to pulse the illuminator LEDs 32 for a short time period, say 500 microseconds or less, and energizes the imager 30 during an exposure time period of a frame to collect light from a target symbol during said time period. A typical array needs about 33 milliseconds to read the entire target image and operates at a frame rate of about 30 frames per second. The array may have on the order of one million addressable image sensors.

The terminal 40 also has a laser scanning module 60 supported by the housing 42, in which event the laser scanning module 60 includes a scanner 62 for scanning at least one of a laser beam from a laser 64 and a field of view of a light detector 66 in a scan pattern, typically comprised of one or more scan lines, across the indicia during reading. The laser scanning module 60 may also include optics 61 for focusing the laser beam to have a large depth of field, and a digitizer 68 for converting an electrical analog signal generated by the detector 66 into a digital signal for subsequent decoding.

In operation of the laser scanning module 60, the controller 70 energizes the laser 64 to emit the laser beam, and energizes the scanner 62 to sweep the laser beam in the scan pattern. The controller 70 also processes the digitized signal from the digitizer 68 into data descriptive of the symbol.

Figure 2:
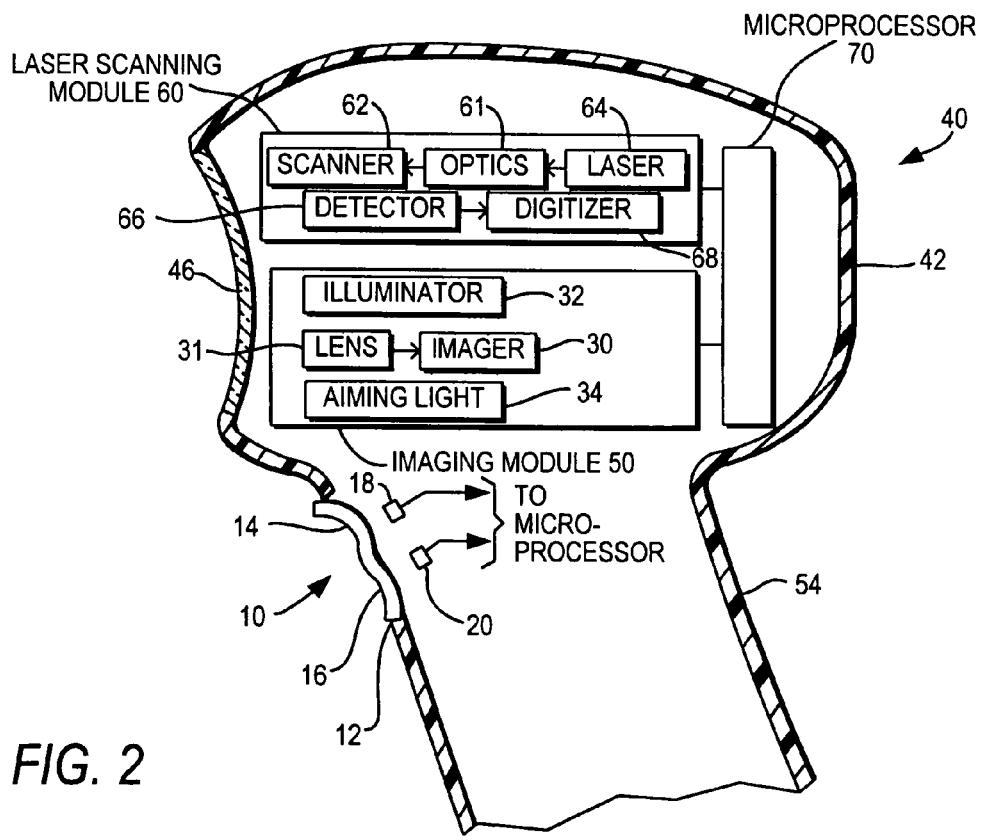
FIG. 2 is a broken-away, sectional view of a housing of the terminal of FIG. 1 schematically depicting a laser scanning module and an imaging module in the housing, together with a triggering mechanism.

As illustrated in FIG. 2, the terminal 40 comprises both the laser scanning module 60 and the imaging module 50 in the same housing 42 and preferably share the same controller 70 and the same presentation area 46 or window.

Figure 3:
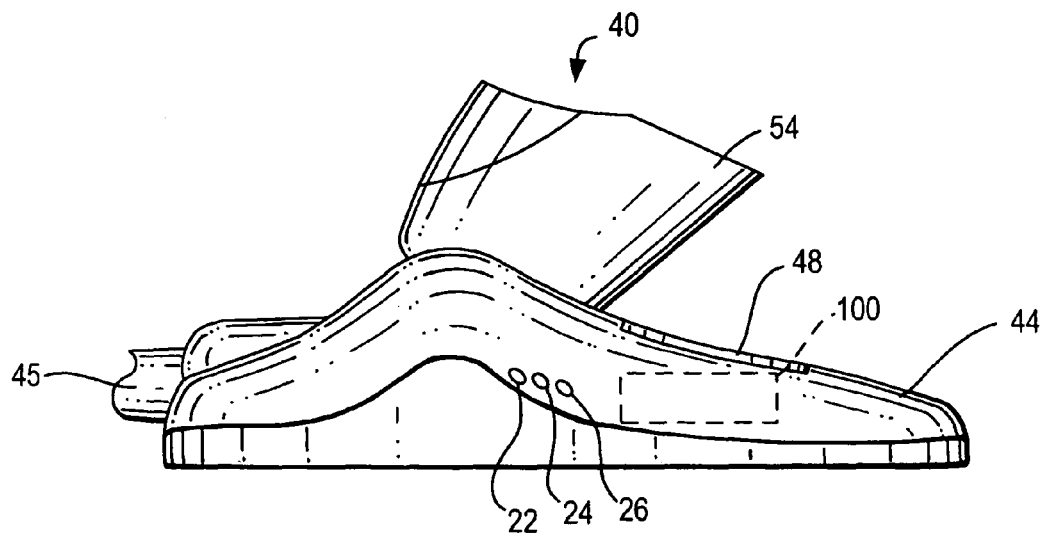
FIG. 3 is a broken-away, elevational view of a base of the terminal of FIG. 1 depicting an RFID module in the base.
Figure 4:
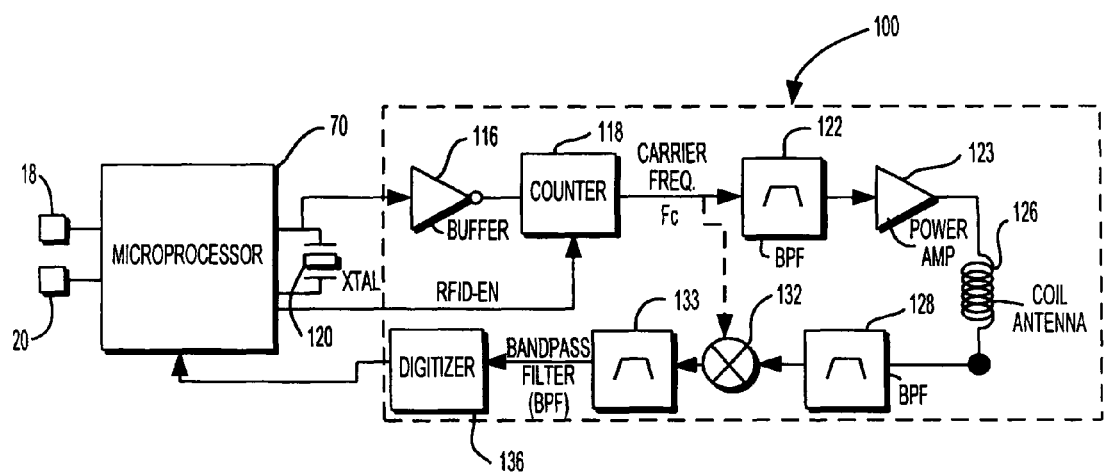
FIG. 4 is a circuit schematic depicting the RFID module of FIG. 3.

As illustrated in FIG. 3, the terminal 40 also has an RFID module 100 supported in the base 44 underneath an access door 48. As shown in FIG. 4, a crystal clock (XTAL) 120 provides a clock signal to the controller 70. A buffer amplifier 116 amplifies and processes the clock signal from clock 120 and provides a signal to a counter 118. The controller 70 also provides an RFID enable (RFID-EN) signal to the counter 118 which enables the RFID circuit. Thereafter, the counter signal at a carrier frequency (Fc) is filtered by a bandpass filter (BPF) 112, amplified by a power amplifier 123, and then propagated as an RF field via an antenna 126. Antenna 126 then determines, either through inductive coupling, through RF propagation, or other suitable RF method, whether there is an RFID tag or transponder in the RF field propagated by the antenna 126, and, if so, the characteristics of the interrogated RFID tag.

In operation, the antenna 126 transmits a data signal based on the RF information to a bandpass filter 128 that then transmits the signal to a multiplier 132. The multiplier 132 samples the signal at a frequency rate controlled by the counter 118 and then transmits the sampled signal to another bandpass filter 133 which pre-processes the data signal and transmits it to a digitizer 136, after which it preferably is transmitted as a suitable digital signal to the controller 70 that processes the digitized signal from the digitizer 68 into data descriptive of the tag.

The terminal 40 can thus also be used in a hands-free mode as a stationary workstation in which products bearing RFID tags to be read are presented to, or slid or swiped past, the base 44 or access door 48. The terminal 40 can also be picked up by the operator off the countertop 52 by the handle 54 and held in the operator's hand in a handheld mode and presented to the RFID tag to be read.

In accordance with one aspect of this invention, the aforementioned trigger mechanism 10 is manually actuatable by the operator to initiate actuation of the readers 50, 60, 100 in the handheld mode with different triggering actions unique to the respective readers. The trigger mechanism 10 includes a trigger 12 depressable by one finger, e.g., the index finger, to initiate actuation of one of the readers, e.g., the reader 60, by another finger, e.g., the middle finger, to initiate actuation of another of the readers, e.g., the reader 50, and simultaneously by both fingers, e.g., the index and middle fingers, to initiate actuation of still another of the readers, e.g., the reader 100. Preferably, the trigger 12 includes one arcuate notch 14 to receive the one finger, and another arcuate notch 16 to receive the other finger.

The trigger mechanism 10 also includes one switch 18 that is switched when the trigger 12 is depressed by the one finger, and another switch 20 that is switched when the trigger 12 is depressed by the other finger. Both switches 18, 20 are preferably simultaneously switched when the trigger 12 is depressed by the both fingers. The trigger mechanism 10 generates different control signals in response to the different triggering actions. The controller 70 for the readers 50, 60, 100 is operatively connected to the trigger mechanism 10, for controlling the readers in response to receiving the control signals.

In the hands-free mode, the controller 70 is operative for automatically actuating at least one of the readers by default. Advantageously, the controller 70 is operative for automatically periodically actuating one of the readers during first time periods, and for automatically periodically actuating another of the readers during second time periods that occur between the first time periods.

Another aspect of this invention, especially useful in the hands-free mode, resides in a plurality of different indicators 22, 24, 26, each dedicated to a respective reader 50, 60, 100 for indicating a successful reading of the respective reader. For example, an auditory beeper that generates different sounds, or visible lights that generate different colors, can be used to advise the operator which reader 50, 60, 100 successfully decoded a symbol/tag.

This terminal 40 will most frequently be used for hands-free reading of one-dimensional symbols in a point-of-sale retail environment. A sensor built into the terminal 40 will detect when the terminal 40 is placed on the support surface 52, which will signal the controller 70 to enter the hands-free mode. In this mode, the imaging reader 50 may be continuously activated so as to detect and decode a symbol that is presented to the terminal or that is swiped through the field of view of the imager 30. If the terminal 40 has not been used for a predetermined time period (user-definable), then the controller 70 will go into a low power mode in which the illumination LEDs 32 are turned off, or blinked at a low duty cycle, until such time as it is determined that a new symbol has moved into the field of view of the imager 30.

The range of working distances in which a symbol is readable for a hands free terminal should preferably be limited to not more than around eight inches, or else, accidental reads may result when an arm load of products is placed or dropped on the countertop 52 near the terminal. In some environments, operators may wish to increase or reduce this range; hence, the working range should be user-programmable.

The aiming light pattern generator 34 should normally be turned off by the controller 70 when the terminal is in the hands-free mode, but a user-selectable option to turn it on may be provided. If this option is selected, the aiming pattern should be deenergized when the terminal enters a power saving mode. In addition, even when the operator has elected to enable the aiming pattern in the hands-free mode, the aiming light pattern generator 34 should be turned off by the controller 70 unless a change in the captured image indicates movement in front of the terminal, at which time the aiming light pattern generator 34 can be activated. The aiming pattern should be turned off again by the controller 70 after a short period of non-use.

The terminal will sometimes be called upon to read a two-dimensional symbol, for example, on a driver's license for age verification. The aiming light pattern is designed to facilitate this by clearly indicating where the center and the periphery of the field of view are located, to enable the operator to position the two-dimensional symbol entirely within the field of view. The aiming light pattern generator 34 should therefore be immediately enabled as soon as it is determined that a two-dimensional symbol is in the field of view. As soon as the two-dimensional symbol decodes, the aiming pattern can be disabled until the next two-dimensional symbol is detected, unless the operator has previously elected to enable the aiming light pattern generator 34 in the hands-free mode. Disabling the aiming pattern upon decode provides visual decode confirmation to the operator.

Driver's licenses often have glossy surfaces. Hence, specular reflection of return light from the illumination LEDs 32 can make two-dimensional symbols on the licenses difficult to decode due to the glare. When a two-dimensional symbol is detected, different ones of the illumination LEDs 32 should be illuminated on alternate frames. Alternating the illumination LEDs 32 causes the areas obscured by specular reflection to move; hence, different parts of the symbol will be obscured on different frames. The data from more then one frame will therefore have to be combined to decode the entire symbol. It is anticipated that driver's licenses will be presented or slowly swiped. Combining data from more than one frame will also allow swipe scanning of driver's licenses.

Sometimes specular reflection will also cause a glossy one-dimensional symbol to be difficult to decode. The operator will experience this as a failure to decode quickly when the symbol is swiped through the imager's field of view. When this happens, it is reasonable to expect the operator to present the symbol in a second attempt to get it to read. It would therefore be beneficial to begin alternating illumination LEDs 32 as described above, whenever it is determined that a symbol has been in the field of view for more than a predetermined time period without decoding. A delay of a couple of hundred milliseconds will typically be adequate since a symbol that is not failing to read from specular reflection will have decoded and moved out of the field of view much faster than this. After a successful decode has been achieved, the terminal can return to its normal mode of illuminating all of the illumination LEDs 32 every frame, so as to provide maximum range and swipe speed.

The operator may attempt to scan a two-dimensional symbol with the laser scanning reader 60 while using the terminal in the handheld mode. In this case, the controller 70 may detect that a two-dimensional symbol is being scanned (using data from the laser scanning reader 60) and immediately turn off the laser scanning reader 60 and enable the imaging reader 50 and the aiming pattern generator 34 until the two-dimensional symbol is decoded. When the imaging reader 50 and the aiming pattern generator 34 are disabled, the laser scanning reader 60 should then be enabled next time the trigger 12 is pressed.

If the terminal uses the imaging reader by default in the handheld mode, the aiming pattern may be activated immediately when the terminal is lifted off the support surface 52. This allows the operator to aim the terminal before pulling the trigger 12, at which time the imaging reader 50 (along with its illumination LEDs 32) will be activated until the trigger 12 is released, or until a predetermined timeout has elapsed, or until the symbol is decoded. This mode is particularly useful when scanning symbol menus, as it avoids the accidental reading of the wrong symbol. It is also useful when scanning symbols on small items where several items can be in the field of view at the same time, as the various symbols can easily be targeted individually before reading. The aiming light generator 34 should be disabled after several minutes of non-use in the handheld mode, and be reenabled when the trigger 12 is pulled.

The aiming pattern can also be used to provide visual feedback that a decode has occurred, by turning it off upon decode, and not turning it back on until the trigger 12 is released. This is analogous to the feedback operators receive when the laser of a laser scanning reader shuts off automatically upon decode. Alternatively, the aiming pattern (along with the imager 30 and the illumination LEDs 32) can be activated only when the trigger 12 is pressed, and disabled automatically upon decode. This should be user selectable in the event the operator doesn't want to use the default mode of operation described above.

Specular reflection can cause decode failure in the handheld mode just as it does in the hands-free mode. Hence, multiple illumination LEDs 32 should alternate if decode doesn't occur rapidly. Preferably, the default mode has the LEDs 32 alternate after a delay of a few hundred milliseconds, but the operator should be able to disable this feature or alter the delay time if desired.

Use of the trigger mechanism 10 allows the operator to optimize the use of the terminal for maximum productivity, and also enables implementation of unanticipated reading modalities that the availability of this combination of data capture technologies enables in a single terminal. In the default mode, all combinations (either finger or both fingers together) will cause the terminal to behave as described above in the handheld mode. In other words, any combination of trigger actuations will behave like the normal single trigger on a typical handheld laser scanning reader. The operator, however, may individually program the function of each trigger actuation. For example, the operator can program the index finger to trigger the laser scanning reader 60, the imaging reader 50, or the RFID reader 100. The operator will also be able to program the middle finger to trigger the laser scanning reader 60, the imaging reader 50, or the RFID reader 100. The operator can also program the condition where both switches 18, 20 are pressed at once to trigger the laser scanning reader 60, the imaging reader 50, or the RFID reader 100.

Some operators may not want to implement the mode when both switches 18, 20 are pressed simultaneously. If the operator does not select a function for the mode where both switches 18, 20 are pressed simultaneously, then the terminal may remain in whatever mode it was in just prior to both switches 18, 20 being pressed. For example, if the operator has programmed the terminal to enable the imaging reader when the middle finger is pressed, but accidentally presses the trigger 12 hard enough with his middle finger to unintentionally close the other switch that is normally operated by the index finger, then the imaging reader should remain actuated. The trigger mechanism 10 is preferably disabled when the terminal is resting on the support surface 52.

In the default hands-free mode, the terminal should advantageously be in a low duty cycle mode where it checks periodically for the presence of an RFID tag. This low duty cycle mode is intended to maintain overall power consumption at a low enough level that the terminal can be powered from a USB interface without the need for an external power supply via the electrical cable 45. The RFID reader 100 can be actuated by the controller 70 briefly between blinks of the imager's illumination LEDs 32. The RFID reader will be responsive enough even if only enabled every second or third blink of the illumination LEDs 32.

When the RFID reader 100 detects a tag, the imaging reader 50 can be momentarily switched off during the tag reading operation, to assure that peak current does not go too high. If the RFID reader has not been used for a while, its duty cycle can be decreased until such time as a tag is detected, to further reduce power consumption.

In the handheld mode, the default mode would advantageously be to turn off the RFID reader 100 as soon as the terminal is lifted, and turn it on only when the trigger 12 is activated as described above. Alternatively, some operators may want to use the RFID reader 100 in triggerless mode even when the terminal is handheld. Operators will therefore be able to select a mode in which the RFID reader 100 will remain active when the terminal is lifted. The RFID reader 100 will, however, be momentarily deactivated when the operator presses the trigger 12 to read a symbol, so as to minimize power consumption.

When the terminal is resting on the support surface 52 for hands-free scanning, there will be a possibility of accidental symbol reads even though the working range will have been reduced. There will also exist the possibility of accidental reads of RFID tags. In the event that an accidental read occurs, the operator needs to know if it was a symbol or an RFID tag that was read, so that corrective action can be taken. It is therefore important that an auditory beeper be driven at a different sound frequency to indicate a successful reading of a symbol than is used for an RFID read. Also, LEDs of different colors can be used depending on what was decoded. For example, a blue LED could indicate when the RFID reader has read a tag, and a green LED could indicate when a symbol has been read.

It will be understood that each of the elements described above, or two or more together, also may find a useful application in other types of constructions differing from the types described above. Thus, terminals having different configurations can be used.

While the invention has been illustrated and described as integrating multiple readers in a data capture terminal operative in both handheld and hands-free modes of operation in accordance with a method for performing such data capture, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A data capture terminal for automatically capturing data in a handheld mode, and in a hands-free mode, of operation, comprising:
    an actuatable laser scanning reader supported by the terminal for electro-optically reading indicia to obtain data by scanning the indicia;
    an actuatable imaging reader supported by the terminal for electro-optically reading indicia to obtain data by capturing an image of the indicia;
    an actuatable radio frequency identification (RFID) reader supported by the terminal for reading an RFID tag to obtain data;
    a trigger mechanism manually actuatable by an operator to initiate actuation of the readers in the handheld mode with different triggering actions unique to the respective readers; and
    wherein the trigger mechanism includes a trigger depressable by one finger to initiate actuation of one of the readers, by another finger to initiate actuation of another of the readers, and by both fingers to initiate actuation of still another of the readers, wherein the trigger mechanism includes one switch that is switched when the trigger is depressed by the one finger, and another switch that is switched when the trigger is depressed by the other finger, both switches being switched when the trigger is depressed by the both fingers.

2. The terminal of claim 1, wherein the laser scanning reader includes a scanner for scanning at least one of a laser beam from a laser and a field of view of a light detector in a scan pattern across the indicia during reading, wherein the imaging reader includes a solid-state imager having an array of image sensors for capturing return light from the indicia during reading; and wherein the RFID reader includes an antenna for propagating a radio frequency field during reading.

3. The terminal of claim 1, wherein the trigger includes one notch to receive the one finger, and another notch to receive the other finger.

4. The terminal of claim 1, wherein the trigger mechanism generates different control signals in response to the different triggering actions, and a controller operatively connected to the trigger mechanism and the readers, for controlling the readers in response to receiving the control signals.

5. The terminal of claim 1, and a plurality of different indicators, each dedicated to a respective reader for indicating a successful reading of the respective reader in the hands-free mode.

6. The terminal of claim 1, and a controller operatively connected to the readers, for controlling the readers, the controller being operative for automatically actuating at least one of the readers by default in the hands-free mode.

7. The terminal of claim 6, wherein the controller is operative for automatically periodically actuating the at least one reader during first time periods, and for automatically periodically actuating another of the readers during second time periods that occur between the first time periods, in the hands-free mode.

8. The terminal of claim 1, and a support for supporting the readers and the trigger mechanism, the support having a housing with a handle to be held by the operator in the handheld mode of operation, and a base for supporting the housing on a support surface during the hands-free mode of operation.

9. A data capture terminal for automatically capturing data in a handheld mode, and in a hands-free mode, of operation, comprising:
    actuatable laser scanning reading means for electro-optically reading indicia to obtain data by scanning the indicia;
    actuatable imaging reading means for electro-optically reading indicia to obtain data by capturing an image of the indicia;
    actuatable radio frequency identification (RFID) reading means for reading an RFID tag to obtain data;
    trigger means manually actuatable by an operator to initiate actuation of the reading means in the handheld mode with different triggering actions unique to the respective reading means; and
    wherein the trigger means includes a trigger depressable by one finger to initiate actuation of one of reading means, by another finger to initiate actuation of another of the reading means, and by both fingers to initiate actuation of still another of the reading means.

10. A method of automatically capturing data in a handheld mode, and in a hands-free mode, of operation, comprising the steps of:
    electro-optically reading indicia to obtain data by scanning the indicia upon actuation of a laser scanning reader;
    electro-optically reading indicia to obtain data by capturing an image of the indicia upon actuation of an imaging reader;
    reading an RFID tag to obtain data upon actuation of a radio frequency identification (RFID) reader;
    initiating actuation of the readers in the handheld mode by having an operator manually actuate a trigger mechanism with different triggering actions unique to the respective readers; and
    wherein the actuation of the trigger mechanism is performed by depressing a trigger with one finger to actuate one of the readers, with another finger to actuate another of the readers, and with both fingers to actuate still another of the readers, wherein the actuation of the trigger mechanism is performed by switching one switch when the trigger is depressed by the one finger, by switching another switch when the trigger is depressed by the other finger, and by switching both switches when the trigger is depressed by the both fingers.

11. The method of claim 10, wherein the reading by scanning the indicia is performed by scanning at least one of a laser beam from a laser and a field of view of a light detector in a scan pattern across the indicia during reading, wherein the reading by capturing the image is performed by a solid-state imager having an array of image sensors for capturing return light from the indicia during reading; and wherein the reading of the RFID tag is performed by an antenna for propagating a radio frequency field during reading.

12. The method of claim 10, and configuring the trigger with one notch to receive the one finger, and another notch to receive the other finger.

13. The method of claim 10, wherein the actuation of the trigger mechanism generates different control signals in response to the different triggering actions, and controlling the readers in response to generating the control signals.

14. The method of claim 10, and indicating a successful reading of the respective readers in the hands-free mode with a plurality of different dedicated indicators.

15. The method of claim 10, and automatically actuating at least one of the readers by default in the hands-free mode.

16. The method of claim 15, and automatically periodically actuating the at least one reader during first time periods, and automatically periodically actuating another of the readers during second time periods that occur between the first time periods, in the hands-free mode.

17. The method of claim 10, and supporting the readers and the trigger mechanism with a support, and configuring the support with a housing having a handle to be held by the operator in the handheld mode of operation, and with a base for supporting the housing on a support surface during the hands-free mode of operation.

* * * * *